United States Patent
Izui et al.

(10) Patent No.: US 10,736,007 B2
(45) Date of Patent: Aug. 4, 2020

(54) FIRST BASE STATION, METHOD, AND NON-TRANSITORY COMPUTER READABLE MEDIUM STORING A PROGRAM

(71) Applicant: NEC CORPORATION, Tokyo (JP)

(72) Inventors: Kohei Izui, Tokyo (JP); Kanada Nakayasu, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 11 days.

(21) Appl. No.: 16/055,410

(22) Filed: Aug. 6, 2018

(65) Prior Publication Data

US 2019/0075499 A1 Mar. 7, 2019

(30) Foreign Application Priority Data

Sep. 1, 2017 (JP) .................... 2017-168268

(51) Int. Cl.
*H04W 36/00* (2009.01)
*H04W 36/08* (2009.01)
*H04W 16/28* (2009.01)
*H04W 8/08* (2009.01)
*H04W 36/30* (2009.01)

(52) U.S. Cl.
CPC ............ *H04W 36/08* (2013.01); *H04W 8/08* (2013.01); *H04W 16/28* (2013.01); *H04W 36/0079* (2018.08); *H04W 36/305* (2018.08)

(58) Field of Classification Search
CPC ... H04W 36/08; H04W 36/305; H04W 16/28; H04W 8/08
See application file for complete search history.

(56) References Cited

U.S. PATENT DOCUMENTS

| | | | |
|---|---|---|---|
| 5,890,067 A * | 3/1999 | Chang | H04W 16/28 455/442 |
| 8,743,825 B2 * | 6/2014 | Sebire | H04W 36/0055 370/331 |
| 2003/0114196 A1* | 6/2003 | Chitrapu | H01Q 1/246 455/562.1 |
| 2004/0063430 A1* | 4/2004 | Cave | H04W 36/30 455/436 |
| 2005/0272472 A1* | 12/2005 | Goldberg | H04W 16/28 455/562.1 |
| 2006/0227744 A1* | 10/2006 | Metke | H04W 36/32 370/331 |

(Continued)

FOREIGN PATENT DOCUMENTS

| | | | |
|---|---|---|---|
| JP | 2009-530900 A | 8/2009 | |
| JP | 2018207333 | * 12/2018 | ............ H04W 16/28 |

*Primary Examiner* — Khoi H Tran
*Assistant Examiner* — B M M Hannan
(74) *Attorney, Agent, or Firm* — Sughrue Mion, PLLC

(57) ABSTRACT

To enable avoidance of termination of wireless connection between a base station and a terminal apparatus. A first base station (a base station 100A) comprises: an acquisition unit 141 configured to acquire mobility information on a terminal apparatus 200, the mobility information corresponding to information related to a beam formed for wireless communication with the terminal apparatus 200; and a control unit 143 configured to control processing related to handover for the terminal apparatus 200, based on the mobility information on the terminal apparatus 200.

12 Claims, 8 Drawing Sheets

(56) References Cited

U.S. PATENT DOCUMENTS

| | | | | |
|---|---|---|---|---|
| 2008/0171516 A1* | 7/2008 | Kakura | .............. | H04B 7/086 |
| | | | | 455/63.4 |
| 2009/0298502 A1 | 12/2009 | Hagerman et al. | | |
| 2010/0113002 A1* | 5/2010 | Joko | .............. | H04B 7/022 |
| | | | | 455/422.1 |
| 2013/0337822 A1* | 12/2013 | Rubin | .............. | H04L 1/00 |
| | | | | 455/452.1 |
| 2014/0051445 A1* | 2/2014 | Vikberg | .............. | H04W 36/02 |
| | | | | 455/436 |
| 2014/0098912 A1* | 4/2014 | Yin | .............. | H04B 7/0417 |
| | | | | 375/345 |
| 2014/0148173 A1* | 5/2014 | Karaoguz | .............. | H04B 7/0408 |
| | | | | 455/440 |
| 2014/0162655 A1* | 6/2014 | Hong | .............. | H01Q 21/061 |
| | | | | 455/436 |
| 2014/0204902 A1* | 7/2014 | Maltsev | .............. | H04W 36/0083 |
| | | | | 370/331 |
| 2015/0131616 A1* | 5/2015 | Jo | .............. | H04W 36/00835 |
| | | | | 370/331 |
| 2015/0230263 A1* | 8/2015 | Roy | .............. | H04W 16/28 |
| | | | | 455/452.2 |
| 2016/0323756 A1* | 11/2016 | Shen | .............. | H04L 5/0053 |
| 2016/0337916 A1* | 11/2016 | Deenoo | .............. | H04W 8/22 |
| 2017/0006539 A1* | 1/2017 | Kakishima | .............. | H04W 48/20 |
| 2017/0208524 A1* | 7/2017 | Fukui | .............. | H04W 16/28 |
| 2017/0367014 A1* | 12/2017 | Bergstrom | .............. | H04B 7/0619 |
| 2018/0199220 A1* | 7/2018 | Reial | .............. | H04W 24/08 |
| 2018/0279181 A1* | 9/2018 | Hampel | .............. | H04W 36/0077 |
| 2018/0352446 A1* | 12/2018 | Tsutsui | .............. | H04B 7/0617 |
| 2019/0014510 A1* | 1/2019 | Rune | .............. | H04W 36/0055 |
| 2019/0098520 A1* | 3/2019 | Kim | .............. | H04W 24/04 |
| 2019/0223058 A1* | 7/2019 | Fukui | .............. | H04B 17/21 |
| 2019/0230569 A1* | 7/2019 | Kim | .............. | H04W 36/30 |

\* cited by examiner

FIRST BASE STATION, METHOD, AND NON-TRANSITORY COMPUTER READABLE MEDIUM STORING A PROGRAM

BACKGROUND

Technical Field

The present disclosure relates to a first base station, a method, and a non-transitory computer readable medium storing a program.

The present application claims priority based on Japanese Patent Application No. 2017-168268, filed on Sep. 1, 2017, the contents of which are incorporated herein by reference.

Background Art

In wireless communication between a base station and a terminal apparatus, processing related to handover is performed as follows. First, the terminal apparatus monitors at a cell boundary the quality of a cell (own cell) where the terminal apparatus exists and the quality of a peripheral cell. Then, notification of the fact that the monitoring result has met a predetermined condition is performed from the terminal apparatus to the base station, and the base station determines whether to perform handover.

Further, for example, Patent Document 1 discloses that a narrow target beam is selected in an area close to an active cell set at present that a mobile unit is using, based on information established in advance related to a narrow beam in the close area, prior to establishment of a new service providing radio link to the mobile unit, and then the selected narrow target beam is used to directly start establishing the new service providing radio link.

[Patent Document 1] Japanese Translation of PCT International Application Publication No. 2009-530900

However, in the processing for handover disclosed in Patent Document 1 or the like, control delay may occur during communication of control signals between base stations. Due to the occurrence of the control delay, the terminal apparatus moves to the outside of a connection range of the base station being a handover source before completion of handover. In this case, the connection between the base station and the terminal apparatus is terminated, thus causing a problem of requiring reconnection processing.

SUMMARY

An example object of the present invention is to provide a first base station, a method, and a non-transitory computer readable medium storing a program that enable avoidance of termination of wireless connection between a base station and a terminal apparatus.

According an example aspect of the present invention, a first base station comprises: a memory storing a program; and one or more processors configured to execute the program to: acquire mobility information on a terminal apparatus, the mobility information corresponding to information related to a beam formed for wireless communication with the terminal apparatus; and control processing related to handover for the terminal apparatus, based on the mobility information on the terminal apparatus.

According an example aspect of the present invention, a method includes: acquiring mobility information on a terminal apparatus, the mobility information corresponding to information related to a beam formed for wireless communication with the terminal apparatus; and controlling processing related to handover for the terminal apparatus, based on the mobility information on the terminal apparatus.

According an example aspect of the present invention, a non-transitory computer readable medium storing a program for causing a processor to execute: acquiring mobility information on a terminal apparatus, the mobility information corresponding to information related to a beam formed for wireless communication with the terminal apparatus; and controlling processing related to handover for the terminal apparatus, based on the mobility information on the terminal apparatus.

According to an example aspect of the present invention, it becomes possible to avoid termination of wireless connection between a base station and a terminal apparatus. The present invention may provide other effects in place of or together with the above effect.

DESCRIPTION OF THE EXAMPLE EMBODIMENTS

Figure 1:
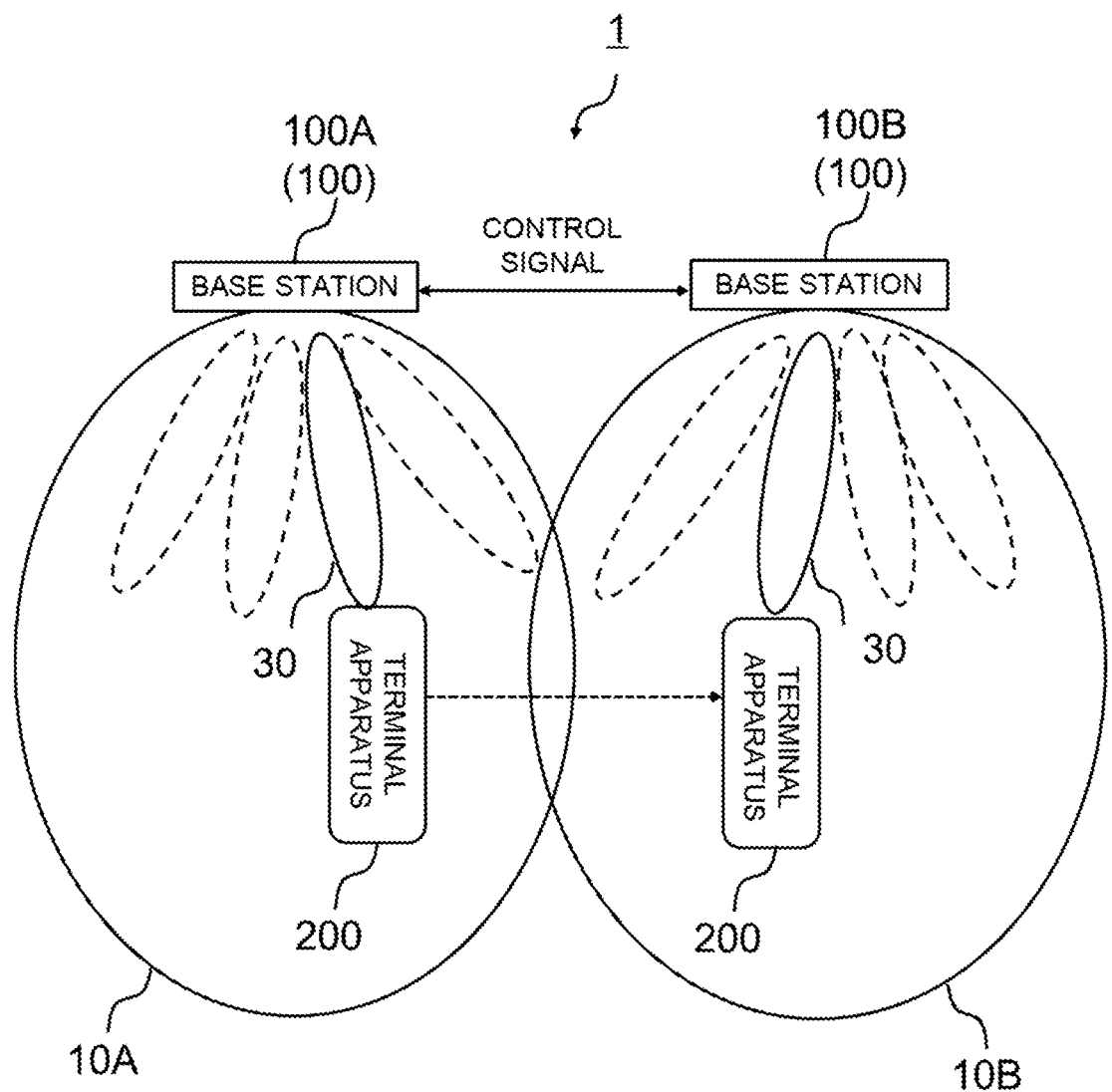
FIG. 1 is an explanatory view illustrating an example of the schematic configuration of a system 1 according to example embodiments of the present invention.

Hereinafter, example embodiments of the present invention will be described in detail referring to the accompanied drawings. Note that elements which can be similarly described in the specification and the drawings may be denoted by the same codes to omit redundant description.

The description will be given in the following order.
1. Overview of example embodiments
2. Configuration of a system
3. First example embodiment
3.1. Configuration of a base station
3.2. Technical feature
3.3. Concrete example
4. Second example embodiment
4.1. Configuration of a base station
4.2. Technical feature
5. Other example embodiments

1. Overview of Example Embodiments

The Overview of example embodiments of the present invention will be described first.

(1) Technical Problems

In wireless communication between a base station and a terminal apparatus, processing related to handover is performed in the following manner. First, the terminal apparatus monitors, at a cell boundary, the quality of a cell (own cell) where the terminal apparatus exists and the quality of a peripheral cell. Then, the fact that a result of the monitoring has met a predetermined condition is notified from the terminal apparatus to the base station, and the base station determines whether to perform handover.

However, while processing for handover is being performed, control delay may occur during communication of a control signal between base stations. Due to the occurrence of the control delay, the terminal apparatus may move to the outside of a connection range of a base station being a handover source before completion of handover in some cases. In this case, the connection between the base station and the terminal apparatus is terminated, thus bringing about a problem of requiring reconnection processing.

Hence, an object of example embodiments of the present invention is to enable avoidance of termination of wireless connection between a base station and a terminal apparatus.

(2) Technical Feature

In the example embodiments of the present invention, for example, a first base station includes an acquisition unit configured to acquire mobility information on a terminal apparatus, the mobility information corresponding to information related to a beam formed for wireless communication with the terminal apparatus, and a control unit configured to control processing related to handover for the terminal apparatus, based on the mobility information on the terminal apparatus.

This makes it possible to avoid termination of the wireless connection between the base station and the terminal apparatus, for example, even if control delay occurs between base stations during execution of handover.

Note that the above technical feature is a concrete example of the example embodiments of the present invention, and the example embodiments of the present invention are not limited to the above technical feature as a matter of course.

2. Configuration of a System

An example of the configuration of a system 1 according to the example embodiments of the present invention will be described referring to FIG. 1. FIG. 1 is an explanatory view illustrating an example of the schematic configuration of the system 1 according to the example embodiments of the present invention. Referring to FIG. 1, the system 1 includes a base station 100A, a base station 100B, and a terminal apparatus 200. Hereinafter, the base station 100A and the base station 100B are generically called a base station 100. The example in FIG. 1 illustrates an appearance in which the terminal apparatus 200 receiving a beam 30 from the base station 100A is subjected to handover from a coverage area 10A side of the base station 100A to a coverage area 10B side of the base station 100B due to movement.

The system 1 is, for example, a system complying with the standard/specification of 3GPP (Third Generation Partnership Project). For example, the system 1 may be a system complying with the standard/specification of LTE/LTE-Advanced and/or SAE (System Architecture Evolution). Alternatively, the system 1 may be a system complying with the standard/specification of Fifth Generation (5G)/NR (New Radio). As a matter of course, the system 1 is not limited to the above examples.

(1) Base Station 100

The base station 100 is a node of a radio access network (RAN) and performs wireless communication with a terminal apparatus (for example, the terminal apparatus 200) located within the coverage area.

The base station 100 may be, for example, an eNB (evolved Node B) or may be a gNB (generation Node B) in 5G. The base station 100 may include a plurality of units (or a plurality of nodes). The plurality of units (or the plurality of nodes) may include a first unit (or a first node) that performs processing for an upper protocol layer, and a second unit (or a second node) that performs processing for a lower protocol layer. As an example, the first unit may be called a center/central unit (CU), and the second unit may be called a distributed unit (DU) or an access unit (AU). As another example, the first unit may be called a digital unit (DU), and the second unit may be called a radio unit (RU) or a remote unit (RU). The above DU (Digital Unit) may be a BBU (Base Band Unit), and the above RU may be an RRH (Remote Radio Head) or an RRU (Remote Radio Unit). As a matter of course, the names of the first unit (or the first node) and the second unit (or the second node) are not limited to those examples. Alternatively, the base station 100 may be a single unit (or a single node). In this case, the base station 100 may be one of the above plurality of units (for example, one of the first unit and the second unit), and may be connected to another unit of the above plurality of units (for example, the other of the first unit and the second unit).

(2) Terminal Apparatus 200

The terminal apparatus 200 performs wireless communication with the base station. The terminal apparatus 200 performs, for example, wireless communication with the base station 100 in the case where the terminal apparatus 200 is located within the coverage area of the base station 100. The terminal apparatus 200 is, for example, UE (User Equipment). The terminal apparatus 200 may be called a "wireless communication apparatus," a "wireless communication terminal," a "user apparatus," a "user terminal," or a "mobile station" instead of the "terminal apparatus."

3. First Example Embodiment

Subsequently, a first example embodiment of the present invention will be described referring to FIG. 2 to FIG. 7.

3.1. Configuration of a Base Station

Figure 2:
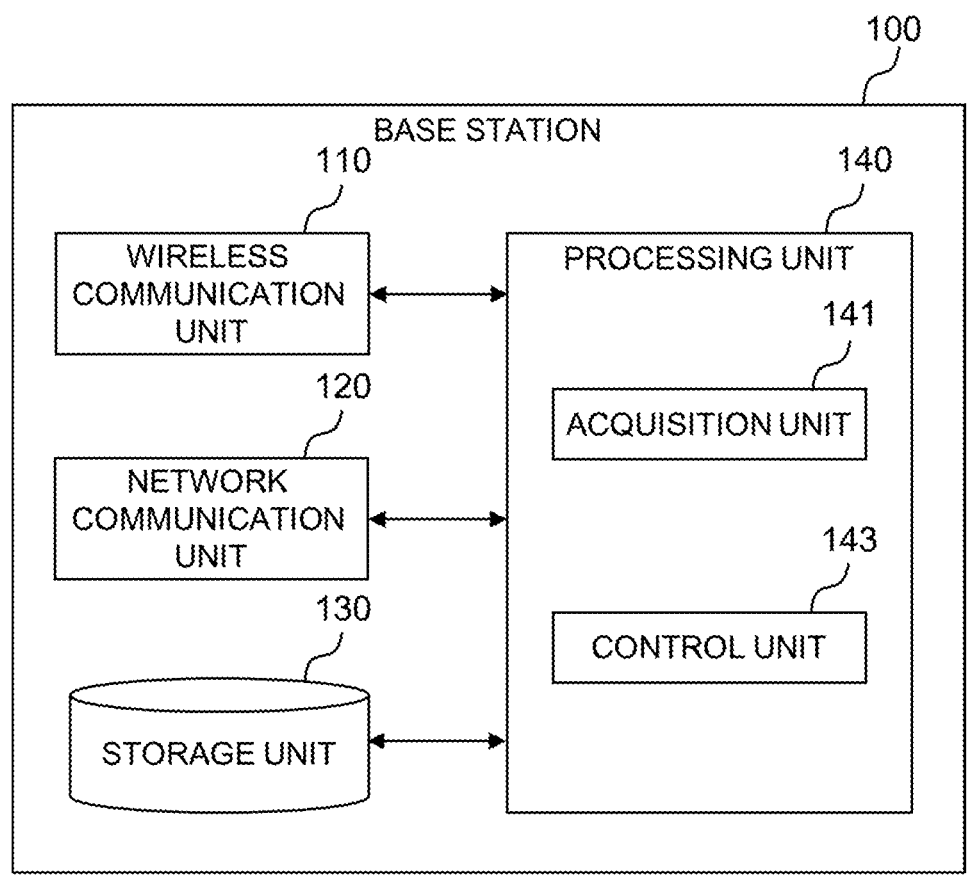
FIG. 2 is a block diagram illustrating an example of the schematic configuration of a base station 100 according to a first example embodiment.

Next, an example of the configuration of a base station 100 according to the first example embodiment will be described referring to FIG. 2. FIG. 2 is a block diagram illustrating an example of the schematic configuration of the base station 100 according to the first example embodiment. Referring to FIG. 2, the base station 100 includes a wireless communication unit 110, a network communication unit 120, a storage unit 130, and a processing unit 140.

(1) Wireless Communication Unit 110

The wireless communication unit 110 wirelessly transmits/receives a signal. For example, the wireless communication unit 110 receives a signal from the terminal apparatus, and transmits a signal to the terminal apparatus. As illustrated in FIG. 1, the wireless communication unit 110 adaptively forms the beam 30 (a communication direction, a communication distance and so on) in accordance with the movement of the terminal apparatus 200, for example, by the beam-forming technology using an ultra multielement antenna, thereby making the beam 30 follow the terminal apparatus 200. More specifically, the wireless communication unit 110 forms a beam, based on the communication information (for example, propagation path estimated value information) with the terminal apparatus 200.

As one example, in the case of using a relatively high frequency band such as a micro wave high in straight advancing property, the wireless communication unit 110 selects a candidate beam for the terminal apparatus 200 from among a plurality of candidate beams which can be formed, and forms a beam for the terminal apparatus 200 corresponding to the selected candidate beam. Alternatively, in the case of using a relatively low frequency band such as a low SHF (Super High Frequency) band, the wireless communication unit 110 forms a beam to an objective terminal apparatus 200 (a beam canceling power going to a direction other than the terminal apparatus 200) by amplitude/phase calculation using a plurality of antennas.

(2) Network Communication Unit 120

The network communication unit 120 receives a signal from a network and transmits a signal to the network.

(3) Storage Unit 130

The storage unit 130 temporarily or permanently stores a program (instruction) and a parameter, and various data for operation of the base station 100. The program includes one or more instructions for operation of the base station 100.

(4) Processing Unit 140

The processing unit 140 provides various functions of the base station 100. The processing unit 140 includes an acquisition unit 141 and a control unit 143. Note that the processing unit 140 may further include other components other than the above components. In other words, the processing unit 140 may perform operations other than the operations of the above components. Concrete operations of the acquisition unit 141 and the control unit 143 will be described later in detail.

For example, the processing unit 140 (the control unit 143) communicates with a terminal apparatus (for example, the terminal apparatus 200) via the wireless communication unit 110. For example, the processing unit 140 (the control unit 143) communicates with other network nodes (for example, a core network node and another base station) via the network communication unit 120.

(5) Implementation Example

The wireless communication unit 110 may be implemented by an antenna and a radio frequency (RF) circuit or the like, and the antenna may be a directional antenna. The network communication unit 120 may be implemented by a network adapter and/or a network interface card or the like. The storage unit 130 may be implemented by a memory (for example, a nonvolatile memory and/or a volatile memory) and/or a hard disk or the like. The processing unit 140 may be implemented by a baseband (BB) processor and/or one or more processors such as other kinds of processors. The acquisition unit 141 and the control unit 143 may be implemented by the same processor, or may be implemented separately by different processors. The above memory (the storage unit 130) may be included in the one or more processors, or may exist outside the one or more processors.

The base station 100 may include a memory that stores a program (instruction) and one or more processors that can execute the program (instruction). The one or more processors may execute the above program to perform the operation of the processing unit 140 (the operations of the acquisition unit 141 and/or the control unit 143). The program may be a program for causing the processor to execute the operation of the processing unit 140 (the operations of the acquisition unit 141 and/or the control unit 143).

Note that the base station 100 may be virtualized. More specifically, the base station 100 may be implemented as a virtual machine. In this case, the base station 100 (the virtual machine) may operate as the virtual machine on a physical machine (hardware) including a processor and a memory and the like, and a hypervisor.

3.2. Technical Feature

Next, the technical feature of the first example embodiment will be described.

The first base station (the acquisition unit 141 of the base station 100A) acquires mobility information on the terminal apparatus 200 corresponding to information related to the beam formed for wireless communication with the terminal apparatus 200 (hereinafter, also referred to as beam information). Then, the first base station (the control unit 143 of the base station 100A) controls the processing related to handover for the terminal apparatus 200, based on the mobility information on the terminal apparatus 200.

(1) Mobility Information

The mobility information on the terminal apparatus 200 is, for example, information related to a moving speed and a moving direction of the terminal apparatus 200. More specifically, the first base station (the acquisition unit 141 of the base station 100A) estimates, as needed, a direction of the beam used for wireless communication with the terminal apparatus 200 and a position of the terminal apparatus 200 corresponding to a transmission level or the like to thereby acquire the mobility information (the moving speed and the moving direction) on the terminal apparatus 200.

(2) Control of Processing Related to Handover

The first base station (the control unit 143 of the base station 100A) predicts occurrence of handover for the terminal apparatus 200, based on the mobility information on the terminal apparatus 200. The "occurrence of handover" here means that handover from the first base station to the second base station becomes necessary depending on the determination processing, for example, based on deterioration in communication quality or the like.

More specifically, the first base station (the control unit 143 of the base station 100A) analyses the mobility acquired by the acquisition unit 141 in a time domain to thereby learn in advance a movement pattern of the terminal apparatus determined that handover occurs. For example, the first base station (the control unit 143 of the base station 100A) learns in advance movement of the terminal apparatus based on a certain rule, such as public transportation facilities, ordinary roads and the like. Utilizing such a leaning result, the first base station (the control unit 143 of the base station 100A) predicts occurrence of handover.

The above learning related to the mobility of the terminal apparatus 200 can be realized here by storing a correspondence between the mobility corresponding to the beam information for the terminal apparatus and information for estimating handover processing start timing. The information for estimating the handover processing start timing is information related to overhead time, for example, time from the determination that the handover occurs until completion of the handover processing. Further, the completion of the handover processing means complete shift of a connection destination of the terminal apparatus 200 to the second base station (for example, the base station 100B) being a handover destination.

The first base station (the control unit 143 of the base station 100A) predicts the occurrence of handover of the terminal apparatus 200, based on the mobility information on the terminal apparatus 200 through the above leaning related to the mobility. More specifically, the first base station (the control unit 143 of the base station 100A) predicts in advance whether the handover occurs by comparing the mobility at present acquired by the acquisition unit 141 with the learned movement pattern.

For example, the first base station (the control unit 143 of the base station 100A) predicts the timing when the handover occurs for the terminal apparatus 200, based on the mobility information on the terminal apparatus 200. Further, the first base station (the control unit 143 of the base station 100A) predicts the second base station (for example, the base station 100B) being the handover destination for the terminal apparatus 200, based on the mobility information on the terminal apparatus 200. Furthermore, the first base station (the control unit 143 of the base station 100A) predicts the beam information related to the beam formed by the second base station (for example, the base station 100B), based on the mobility information on the terminal apparatus 200.

Further, the first base station (the control unit 143 of the base station 100A) transmits the information related to the handover for the terminal apparatus 200, to the second base station (for example, the base station 100B). Note that the first base station (the control unit 143 of the base station 100A) may transmit the information related to the handover for the terminal apparatus 200, to the node of the core network. In other words, the information related to the handover for the terminal apparatus 200 may be transmitted to the second base station (for example, the base station 100B) via the node of the core network.

The information related to the handover for the terminal apparatus 200 here includes the beam information related to the beam formed by the second base station (for example, the base station 100B). Further, the information related to the handover for the terminal apparatus 200 may include the mobility information on the terminal apparatus 200.

The first base station (the control unit 143 of the base station 100A) starts or completes the handover processing in advance before the occurrence of handover based on the quality measurement by the terminal apparatus 200 in the above manner to thereby enable the terminal apparatus to realize the handover at an appropriate position. Accordingly, the first base station (the control unit 143 of the base station 100A) can avoid the situation of termination of the wireless communication with the terminal apparatus even if control delay occurs with respect to the second base station (the base station 100B) during the execution of handover.

Further, the first base station (the control unit 143 of the base station 100A) receives the beam information related to the beam formed in the handover for the terminal apparatus 200, from the second base station (for example, the base station 100B), for example, after the processing related to handover is finished. Reflecting the information received in the above manner in the learning related to the mobility makes it possible to more highly accurately determine whether handover occurs.

3.3. Concrete Example

Figure 3:
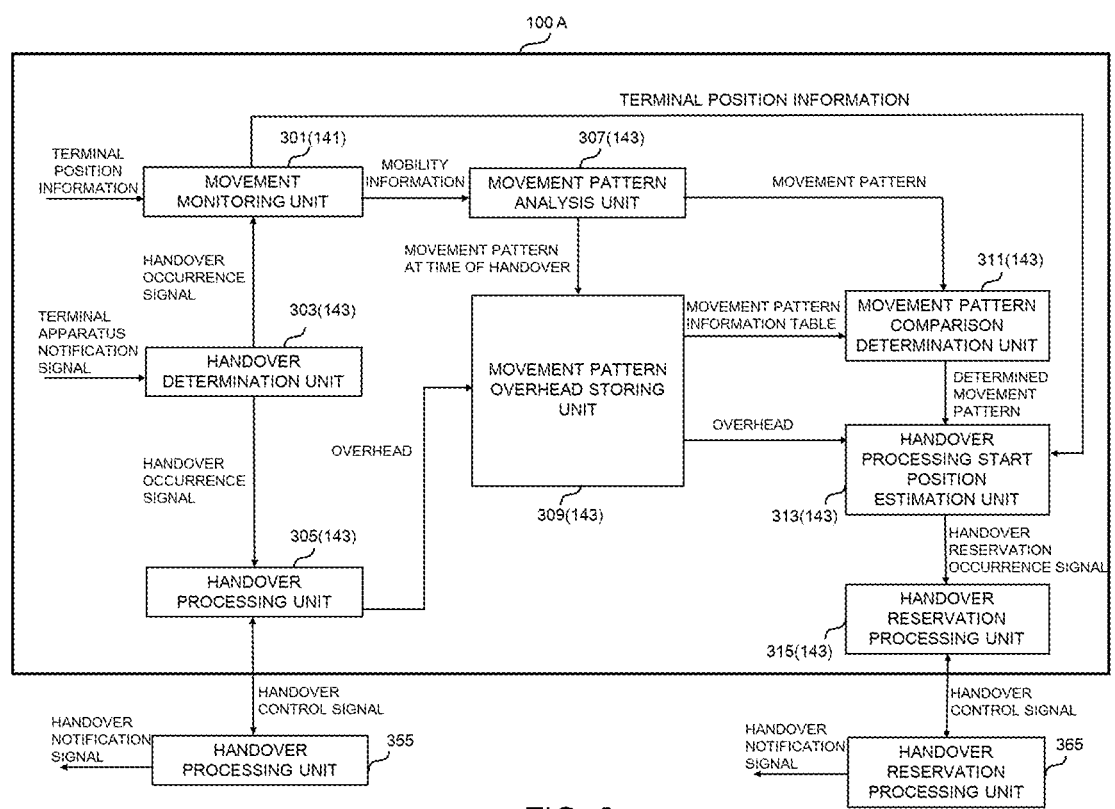
FIG. 3 is a block diagram illustrating a concrete example for realizing functions of an acquisition unit and a control unit of a base station.

Next, a concrete configuration example for realizing the acquisition unit 141 and the control unit 143 of the base station 100A will be described referring to FIG. 3. FIG. 3 is a block diagram illustrating the concrete example for realizing functions of the acquisition unit 141 and the control unit 143 of the base station 100A.

In the concrete example illustrated in FIG. 3, the function of the acquisition unit 141 of the base station 100A is realized mainly by a movement monitoring unit 301. Further, the function of the control unit 143 of the base station 100A is realized mainly by a handover determination unit 303, a handover processing unit 305, a movement pattern analysis unit 307, a movement pattern overhead storing unit 309, a movement pattern comparison determination unit 311, a handover processing start position estimation unit 313, and a handover reservation processing unit 315. Note that though also the base station 100B has the same configuration as that of the base station 100A, a handover processing unit 355 and a handover reservation processing unit 365 are illustrated as a part of the function of the control unit 143 of the base station 100B in FIG. 3 for convenience of description.

The movement monitoring unit 301 stores terminal position information corresponding to the beam information related to the beam formed for the terminal apparatus 200, for a fixed time period, and outputs the terminal position information to the handover processing start position estimation unit 313. Further, when a handover occurrence signal is inputted into the base station 100A, the movement monitoring unit 301 calculates the mobility information (for example, the moving speed, the moving direction and the like), based on the stored terminal position information, and outputs the mobility information to the movement pattern analysis unit 307.

The handover determination unit 303 determines whether to perform handover for the terminal apparatus, for example, based on the information (a terminal apparatus notification signal) related to the communication quality notified from the terminal apparatus 200. When it is determined that there is a need to perform handover for the terminal apparatus 200, the handover determination unit outputs a handover occurrence signal for notification of the occurrence of handover for the terminal apparatus 200, to each of the movement monitoring unit 301 and the handover processing unit 305.

Upon input of the handover occurrence signal, the handover processing unit 305 performs communication with the handover processing unit 355 of a base station 200B to thereby transmit and receive the handover control signal.

The movement pattern analysis unit 307 analyses the movement pattern of the terminal apparatus 200 using the mobility information inputted from the movement monitoring unit 301, and outputs an analysis result to the movement pattern comparison determination unit 311. Further, the movement pattern analysis unit 307 outputs the analysis result to the movement pattern overhead storing unit 309 at the occurrence of handover.

The movement pattern overhead storing unit 309 stores the movement pattern of the terminal apparatus 200 at the occurrence of handover and the overhead time required for the handover corresponding to the movement pattern, for example, into the storage unit 130 of the base station 100A. Further, the movement pattern overhead storing unit 309 outputs a movement pattern information table listing the movement pattern at the occurrence of handover, to the movement pattern comparison determination unit 311 as necessary. Further, when it is predicted that handover occurs, the movement pattern overhead storing unit 309 outputs the overhead time required for the processing for the handover to the handover processing start position estimation unit 313.

The movement pattern comparison determination unit 311 determines whether the movement pattern is a movement pattern causing handover, based on the movement pattern of the terminal apparatus 200 at present referring to the movement pattern information table. When it is determined that the movement pattern of the terminal apparatus 200 at present is a movement pattern causing handover, the movement pattern comparison determination unit 311 outputs the determined movement pattern to the handover processing start position estimation unit 313.

The handover processing start position estimation unit 313 performs next processing for completing the processing for handover, at a handover occurrence position corresponding to the stored movement pattern of the terminal apparatus 200. In other words, the handover processing start position estimation unit 313 estimates a handover processing start position for the terminal apparatus 200 using the overhead time required for the processing for handover corresponding to the determined movement pattern, and present position information on the terminal apparatus 200. Then, when it is estimated that the terminal apparatus 200 has reached the handover processing start position, the handover processing start position estimation unit 313 outputs a handover reservation occurrence signal to the handover reservation processing unit 315.

Upon input of the handover reservation occurrence signal, the handover reservation processing unit 315 communicates with the handover reservation processing unit 365 of the base station 200B and transmits and receives a handover control signal in order to perform handover for the terminal apparatus.

Figure 4:
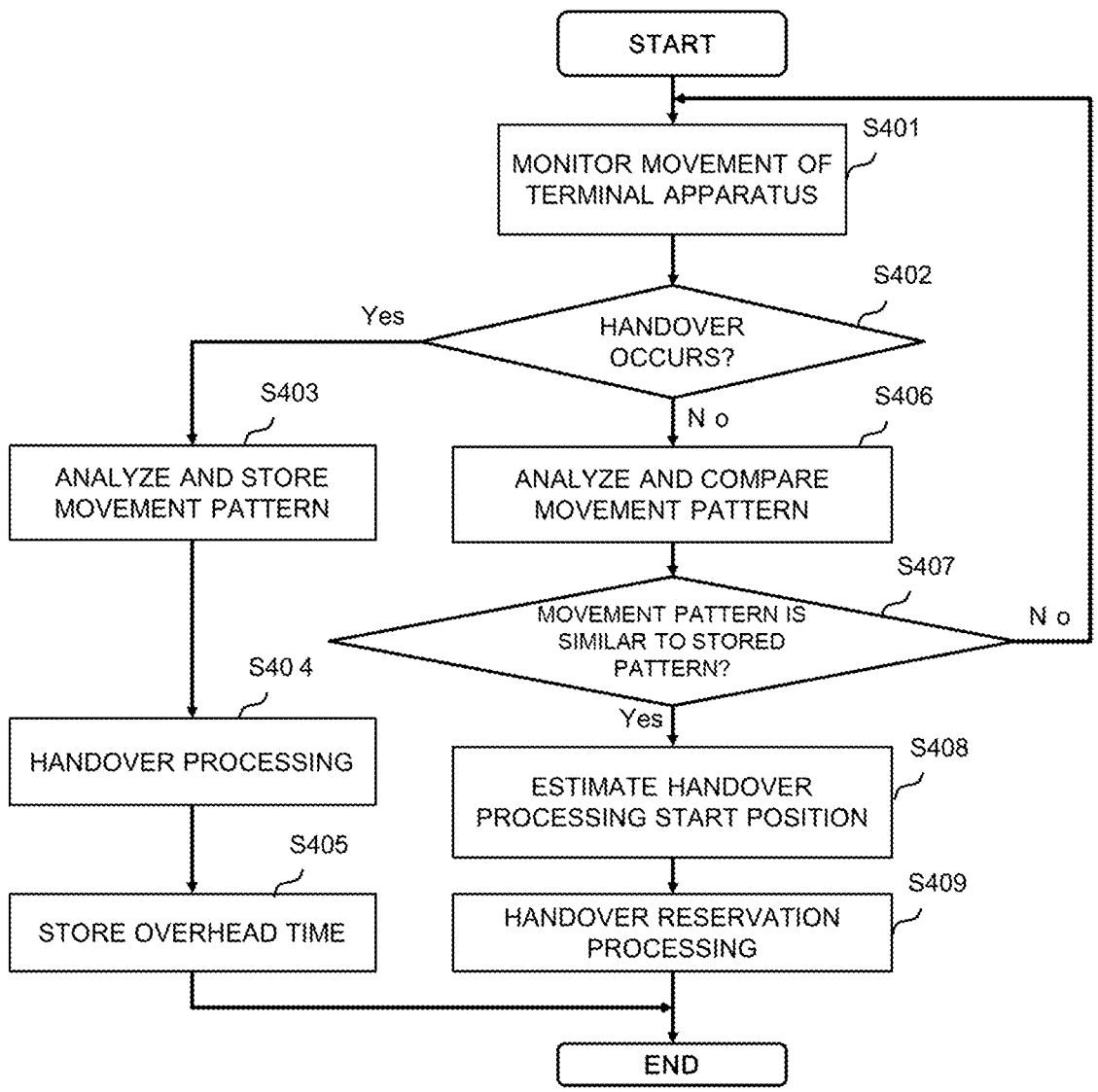
FIG. 4 is a chart illustrating a flow of the operation according to a concrete example.

FIG. 4 is a chart illustrating a flow of the operation according to a concrete example.

At Step S401, the movement monitoring unit 301 stores the position information on the terminal apparatus 200 for a fixed time period. Subsequently, at Step S402, the handover determination unit 303 determines whether handover occurs. When handover occurs (S402: YES), the flow proceeds to Step S403, whereas when handover does not occur (S402: NO), the flow proceeds to Step S406.

At Step S403, the movement pattern analysis unit 307 analyses the movement pattern of the terminal apparatus 200, and the movement pattern overhead storing unit 309 stores the analysis result. Subsequently, at Step S404, the handover processing unit 305 performs the handover processing. Subsequently, at Step S405, the movement pattern overhead storing unit 309 stores the overhead time (processing time) required for the processing for the handover performed by the handover processing unit 305. Thereafter, the processing illustrated in FIG. 4 is finished.

On the other hand, at Step S406, the movement pattern analysis unit 307 analyses the movement pattern at present of the terminal apparatus 200, and the movement pattern comparison determination unit 311 compares the analyzed pattern with the movement pattern stored at the occurrence of handover (stored pattern). Subsequently, at Step S407, the movement pattern comparison determination unit 311 determines whether the movement pattern stored at the occurrence of handover (stored pattern) and the movement pattern at present of the terminal apparatus 200 are similar (whether the correlation is high). When they are similar (S407: YES), the flow proceeds to Step S408, and otherwise (S407: NO), the flow returns to Step S401.

At Step S408, the handover processing start position estimation unit 313 estimates the handover processing start position of the terminal apparatus 200. Subsequently, at Step S409, the handover reservation processing unit 315 starts the handover reservation processing at an appropriate position in consideration of the present position of the terminal apparatus and the stored overhead time. Thereafter, the processing illustrated in FIG. 4 is finished.

Figure 5:
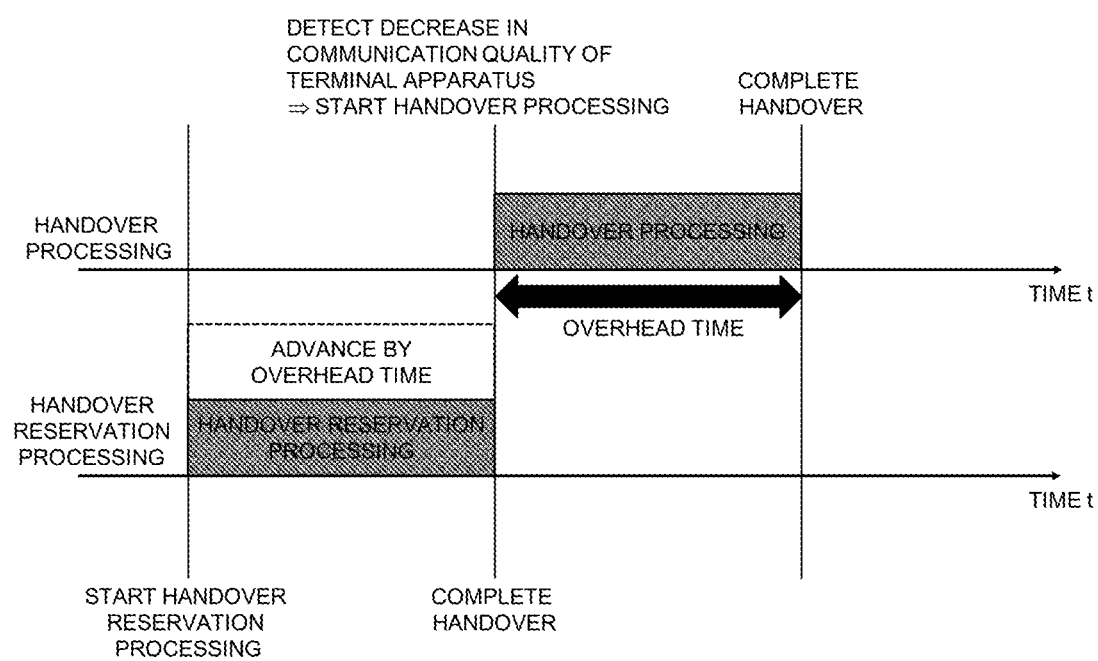
FIG. 5 is a chart for explaining the difference between handover processing performed by a handover processing unit and handover reservation processing performed by a handover reservation processing unit.

FIG. 5 is a chart for explaining the difference between the processing for handover performed by the handover processing unit 305 and the handover reservation processing performed by the handover reservation processing unit 315.

The handover processing unit 305 detects a decrease in communication quality of the terminal apparatus 200, and starts the handover processing. Therefore, it takes the overhead time for start of the processing for handover until completion of the handover. On the other hand, the handover reservation processing unit 315 performs processing while advancing the handover processing by going back by the overhead time by the handover reservation processing, thereby enabling the handover processing to be completed concurrently with the time when the decrease in communication quality is detected and the handover is determined to be necessary (occurrence of handover).

As in the above manner, the base station 100A becomes to be able to avoid termination of the wireless connection with the terminal apparatus 200 even if control delay occurs between base stations during execution of the processing for handover.

Other Concrete Examples

This example embodiment is not limited to the above concrete example.

(1) Concrete Example of Performing Input of Overhead Occurrence Information

The movement pattern overhead storing unit 309 may store handover occurrence information inputted, for example, through a user interface. More specifically, in the case where there is information on the movement pattern, place and so on of occurrence of handover, the movement pattern overhead storing unit 309 may store the information in advance and utilize the information as basic information for learning related to the mobility.

Figure 6:
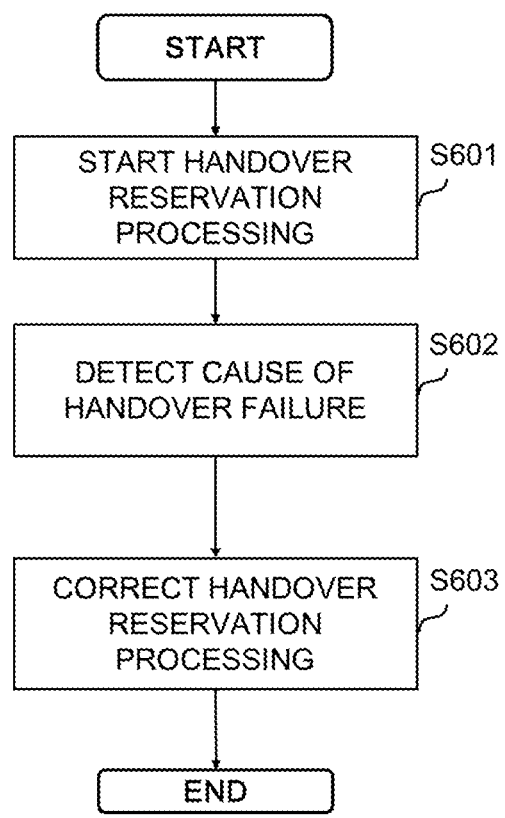
FIG. 6 is a chart illustrating a flow of processing for improving the accuracy of the handover reservation processing by learning a cause of failure in the case where the handover reservation processing has been failed.

(2) Concrete Example of Performing Learning on Failure of Handover Reservation Processing FIG. 6 is a chart illustrating a flow of processing for improving the accuracy of the handover reservation processing by learning a cause of failure in the case where the handover reservation processing has been failed.

The control unit 143 starts the handover reservation processing (Step S601), and detects termination of connection of the terminal apparatus 200 (handover failure) during the handover reservation processing (Step S602). More specifically, the control unit 143 detects the cause of failure of handover such as the handover timing being too early or being too late. Subsequently, the control unit 143 corrects the handover reservation processing such as the handover processing start position, based on the detected cause of failure (Step S603). Thereafter, the processing illustrated in FIG. 6 is finished. Performing the learning processing based on the cause of failure can improve the handover processing accuracy.

(3) Concrete Example of Storing Information Such as a Movement Pattern Responding Only to Failure of Handover The movement pattern overhead storing unit 309 may store only the movement pattern at the time of handover failure (occurrence of termination of connection between the base station and the terminal apparatus) without storing all of the movement patterns at the time of handover occurred in the learning processing. This enables avoidance of termination of wireless connection between the base station 100A and the terminal apparatus 200 utilizing the learning processing while reducing the storing volume.

Figure 7:
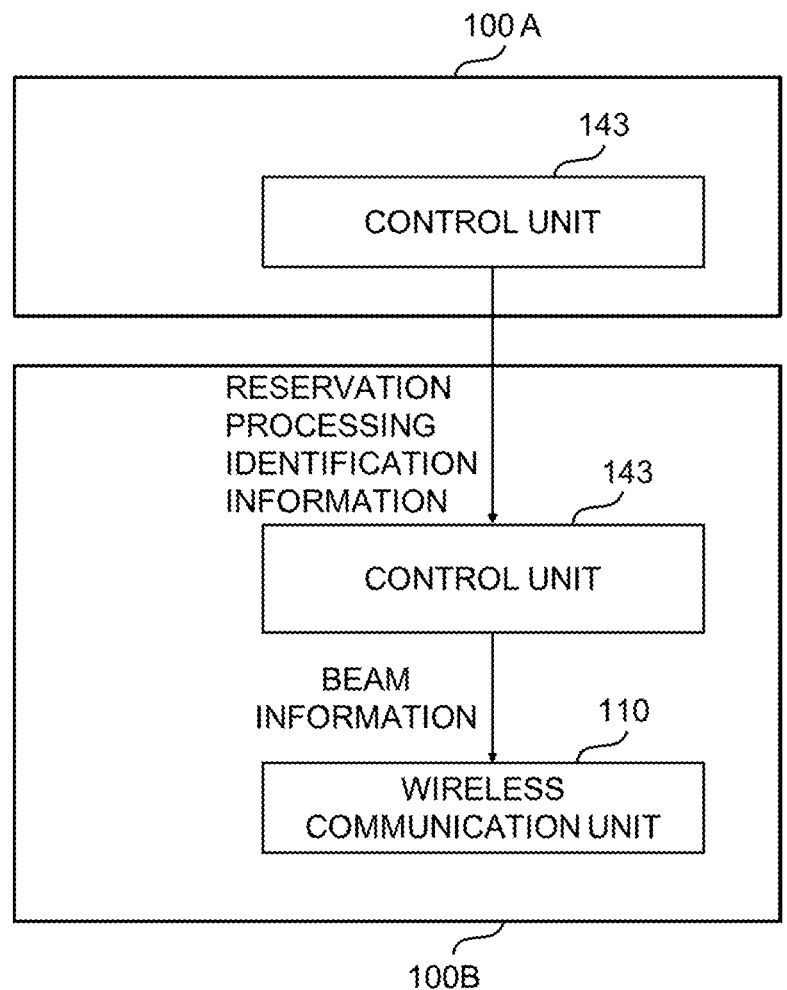
FIG. 7 is a chart illustrating a flow of processing of notification of information related to the handover, more specifically, identification information (for example, information representing a terminal position, a movement pattern and the like) for the handover reservation processing, from a first base station to a second base station.

(4) Concrete Example of Performing Information Notification to Handover Destination FIG. 7 is a chart illustrating a flow of processing of notification of the information related to handover, more specifically, identification information (for example, information representing the terminal position, the movement pattern and the like) for the handover reservation processing, from the first base station (the base station 100A) to the second base station (the base station 100B).

The first base station (the control unit 143 of the base station 100A) notifies, in the case of performing the handover reservation processing, the second base station (the control unit 143 of the base station 100B) being the handover destination of reservation processing identification information. The second base station (the control unit 143 of the base station 100B) stores the identification information for the handover reservation processing, and notifies the wireless communication unit 110, which performs control of a beam or the like, of beam information if there is a store of the beam information when having received the similar notification in the past. Thus, the same beam as that in the past can be generated, thereby improving the beam generation efficiency.

Besides, when termination of connection with the terminal apparatus occurs due to error of the beam generation, the control unit 143 of the base station 100B may perform reconnection processing to learn and correct the beam generation. In the case of having not received the similar notification in the past, the control unit 143 of the base station 100B may execute an existing beam generation sequence to learn the generated beam.

(5) Concrete Example of not Estimating Terminal Position Information

In the case where the terminal apparatus 200 exists within a sight range, it is estimated that the terminal apparatus 200 highly possibly exists at a position to which the main lobe of the beam is directed. On the other hand, when the terminal apparatus 200 exists outside the sight range, it is thought that the terminal apparatus 200 highly possibly exists at a position to which the beam is directed via a plurality of paths. Therefore, the present position of the terminal apparatus is not always estimated correctly only with the aforementioned beam information.

Accordingly, the acquisition unit 141 may acquire the mobility by estimating the present position information on the terminal apparatus 200 in consideration of the information to be calculated when forming the beam directed to the terminal apparatus by the beam-forming technology, for example, a channel estimated value, beam weight information and so on. In this case, the movement pattern overhead storing unit 309 stores the aforementioned channel estimated value, the beam weight information and so on as the terminal position information, and learns their changes and change amounts as a movement pattern.

Further, the control unit 143 may estimate a handover processing start time in place of the handover processing start position. Estimating the handover processing start time in this manner enables avoidance of termination of wireless connection between the base station and the terminal apparatus during execution of the processing for handover even when the terminal apparatus exists outside the sight range.

(6) Concrete Example of Utilizing Higher-Level Device

In the case where the base station 100A being the handover source notifies the base station 100B being the handover destination of the information, the notification may be via one or more nodes of the core network being the higher-level device. Besides, a data base which stores the identification information for the handover reservation processing may be provided in the higher-level device, so that the base station 100B may refer to the data base as necessary.

(7) Regarding Corresponding Coordinates for Terminal Position Estimation

The terminal position information may utilize three-dimensional coordinates using both horizontal directions and a vertical direction.

(8) Responding to Fixed Beam

Not limited to the case of following the terminal apparatus 200 by the beam generation through the beam-forming but, for example, an arbitrary beam may be selected from among fixed beams set in a plurality of directions in advance to follow the terminal apparatus 200. Also in this case, the acquisition unit 141 can acquire the mobility of the terminal apparatus.

4. Second Example Embodiment

Figure 8:
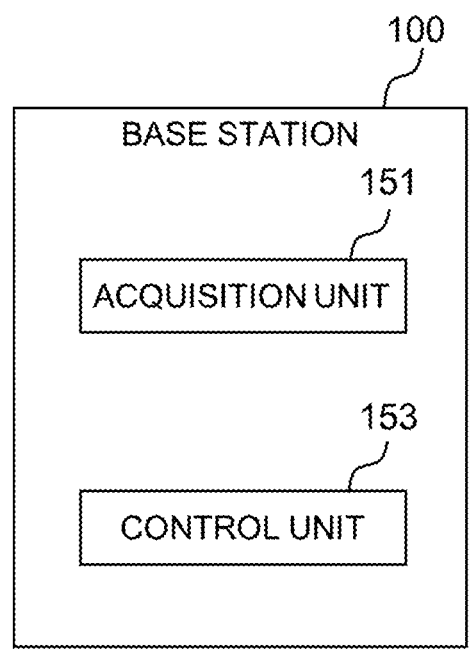
FIG. 8 is a block diagram illustrating an example of the schematic configuration of a base station 100 according to a second example embodiment.

Subsequently, a second example embodiment of the present invention will be described referring to FIG. 8. Though the above first example embodiment is a concrete example embodiment, the second example embodiment is a more generalized example embodiment.

4.1. Configuration of a Base Station

An example of the configuration of a base station 100 according to the second example embodiment will be described referring to FIG. 8. FIG. 8 is a block diagram illustrating the example of the schematic configuration of the base station 100 according to the second example embodiment. Referring to FIG. 8, the base station 100 includes an acquisition unit 151 and a control unit 153. Concrete operations of the acquisition unit 151 and the control unit 153 will be described later.

The acquisition unit 151 and the control unit 153 may be implemented by one or more processors (BB processor and/or another kind of processor or the like) and a memory. The memory may be included in the one or more processors, or may exist outside the one or more processors.

The acquisition unit 151 and the control unit 153 may include a memory that stores a program (instruction) and one or more processors that can execute the program (instruction). The one or more processors may execute the above program to perform the operations of the acquisition unit 151 and the control unit 153. The above program may be a program that causes the processors to execute the operations of the acquisition unit 151 and the control unit 153.

Note that the base station 100 may be virtualized. More specifically, the base station 100 may be implemented as a virtual machine. In this case, the base station 100 (the virtual machine) may operate as the virtual machine on a physical machine (hardware) including a processor and a memory and the like, and a hypervisor.

Note that, as a matter of course, the base station 100 may further include components other than the acquisition unit 151 and the control unit 153. For example, the base station 100 may further include, as in the first example embodiment, a wireless communication unit 110, a network communication unit 120, and/or a storage unit 130, and/or may further include other components.

4.2. Technical Feature

The technical feature of the second example embodiment will be described.

The first base station (the acquisition unit 151 of the base station 100) acquires mobility information on the terminal apparatus corresponding to information related to a beam formed for wireless communication with the terminal apparatus (hereinafter, also referred to as beam information). Then, the first base station (the control unit 153 of the base station 100) controls the processing related to handover for the terminal apparatus, based on the mobility information on the terminal apparatus.

This makes it possible to avoid termination of the wireless connection between the base station and the terminal apparatus, for example, even if control delay occurs between base stations during execution of handover.

As one example, the description about the mobility information and/or the control of the processing related to handover is the same as the description in the first example embodiment. Therefore, duplicated description is omitted here. Note that in this case, the acquisition unit 151 may operate similarly to the acquisition unit 141 in the first example embodiment, and the control unit 153 may operate similarly to the control unit 143 in the first example embodiment.

As a matter of course, the second example embodiment is not limited to the above example.

5. Other Example Embodiments

Although the example embodiments of the present invention have been described above, the present invention is not limited to the example embodiments. It should be understood by the skilled in the art that these example embodiments are examples only and that various changes could be made hereto without departing from the scope and spirit of the present invention.

For example, the apparatus including the components (for example, the acquisition unit and/or the control unit) of the base station described herein (for example, one or more apparatuses (or units) of the plurality of apparatuses (or units) constituting the base station, or a module for one of the plurality of apparatuses (or units)) may be provided. Further, a method including the processing of the components may be provided, and a program for causing a processor to execute the processing of the components may be provided. Further, a non-transitory computer readable medium storing the program thereon may be provided. As a matter of course, such apparatus, module, method, program and non-transitory computer readable medium are also included in the present invention.

Some or all of the above example embodiments may be described as in, but not limited to, the following notes.

(Note 1)

A first base station comprising:

an acquisition unit configured to acquire mobility information on a terminal apparatus, the mobility information corresponding to information related to a beam formed for wireless communication with the terminal apparatus; and a control unit configured to control processing related to handover for the terminal apparatus, based on the mobility information on the terminal apparatus.

(Note 2)

The first base station according to note 1, wherein the control unit predicts occurrence of the handover for the terminal apparatus, based on the mobility information on the terminal apparatus.

(Note 3)

The first base station according to note 2, wherein the control unit predicts timing when the handover for the terminal apparatus occurs, based on the mobility information on the terminal apparatus.

(Note 4)

The first base station according to note 2, wherein the control unit predicts a second base station being a handover destination for the terminal apparatus, based on the mobility information on the terminal apparatus.

(Note 5)

The first base station according to note 4, wherein the control unit predicts information related to a beam formed in the second base station, based on the mobility information on the terminal apparatus.

(Note 6)

The first base station according to note 4, wherein the control unit transmits information related to the handover for the terminal apparatus, to the second base station.

(Note 7)

The first base station according to note 4, wherein the control unit transmits information related to the handover for the terminal apparatus, to a node of a core network.

(Note 8)

The first base station according to note 6, wherein
the information related to the handover for the terminal apparatus includes the information related to the beam formed in the second base station.

(Note 9)

The first base station according to note 6, wherein
the information related to the handover for the terminal apparatus includes the mobility information on the terminal apparatus.

(Note 10)

The first base station according to note 6, wherein
the control unit receives information related to a beam formed in the handover for the terminal apparatus, from the second base station.

(Note 11)

A method including:

acquiring mobility information on a terminal apparatus, the mobility information corresponding to information related to a beam formed for wireless communication with the terminal apparatus; and controlling processing related to handover for the terminal apparatus, based on the mobility information on the terminal apparatus.

(Note 12)

A program for causing a processor to execute:

acquiring mobility information on a terminal apparatus, the mobility information corresponding to information related to a beam formed for wireless communication with the terminal apparatus; and controlling processing related to handover for the terminal apparatus, based on the mobility information on the terminal apparatus.

(Note 13)

A non-transitory computer readable medium storing a program for causing a processor to execute:

acquiring mobility information on a terminal apparatus, the mobility information corresponding to information related to a beam formed for wireless communication with the terminal apparatus; and controlling processing related to handover for the terminal apparatus, based on the mobility information on the terminal apparatus.

Even if control delay occurs between base stations, for example, during execution of handover in a mobile communication system, termination of wireless connection between a base station and a terminal apparatus can be avoided.

What is claimed is:

1. A first base station comprising:
a memory storing a program; and
one or more processors configured to execute the program to:
acquire mobility information on a terminal apparatus, the mobility information being estimated by the first base station from information related to a beam formed for wireless communication between the first base station and the terminal apparatus, wherein the mobility information comprise: moving speed and moving direction of the terminal apparatus;
analyze a present movement pattern of the terminal apparatus based on the mobility information; and
predict occurrence of handover for the terminal apparatus from the first base station to a second base station, by comparing the present movement pattern of the terminal apparatus with a learned movement pattern determined that handover occurs.

2. The first base station according to claim 1, wherein the one or more processors configured to execute the program to predict timing when the handover for the terminal apparatus occurs.

3. The first base station according to claim 1, wherein the one or more processors configured to execute the program to predict a second base station being a handover destination for the terminal apparatus.

4. The first base station according to claim 3, wherein the one or more processors configured to execute the program to predict information related to a beam formed in the second base station.

5. The first base station according to claim 3, wherein the one or more processors configured to execute the program to transmit information related to the handover for the terminal apparatus, to the second base station.

6. The first base station according to claim 5, wherein the information related to the handover for the terminal apparatus includes the information related to the beam formed in the second base station.

7. The first base station according to claim 5, wherein the information related to the handover for the terminal apparatus includes the mobility information on the terminal apparatus.

8. The first base station according to claim 5, wherein the one or more processors configured to execute the program to receive information related to a beam formed in the handover for the terminal apparatus, from the second base station.

9. The first base station according to claim 3, wherein the one or more processors configured to execute the program to transmit information related to the handover for the terminal apparatus, to a node of a core network.

10. The first base station according to claim 1, wherein the learned movement pattern determined that handover occurs is a movement pattern learned based on a correspondence between mobility of a terminal apparatus and information related to time from determination that handover occurs until completion of handover processing.

11. A method including:
acquiring mobility information on a terminal apparatus, the mobility information being estimated by the first base station from information related to a beam formed for wireless communication between the first base station and the terminal apparatus, wherein the mobility information comprise: moving speed and moving direction of the terminal apparatus;
analyzing a present movement pattern of the terminal apparatus based on the mobility information; and
predicting occurrence of handover for the terminal apparatus from the first base station to a second base station, by comparing the present movement pattern of the terminal apparatus with a learned movement pattern determined that handover occurs.

12. A non-transitory computer readable medium storing a program for causing a processor to execute:
acquiring mobility information on a terminal apparatus, the mobility information being estimated by the first base station from information related to a beam formed for wireless communication between the first base station and the terminal apparatus, wherein the mobility information comprise: moving speed and moving direction of the terminal apparatus;
analyzing a present movement pattern of the terminal apparatus based on the mobility information; and
predicting occurrence of handover for the terminal apparatus from the first base station to a second base station, by comparing the present movement pattern of the terminal apparatus with a learned movement pattern determined that handover occurs.

\* \* \* \* \*